INVENTOR.
EDWARD V. THOMAS
BY
ATTYS.

3,449,672
NONPHASE-SENSITIVE SUMMARY AND
AVERAGING A.C. VOLTMETER
Edward V. Thomas, 102 Southway,
Severna Park, Md. 21146
Filed Nov. 27, 1963, Ser. No. 326,640
Int. Cl. G01r 7/04
U.S. Cl. 324—140                                6 Claims

ABSTRACT OF THE DISCLOSURE

The voltmeter has a plurality of A.C. voltages fed to a plurality of respective rectifying networks. The outputs of the rectifying networks are connected in series to provide a series summation of the D.C. voltages. The D.C. voltages are then fed to the input of a logarithmic amplifier and the output of the amplifier is fed to a voltmeter.

---

The invention described herein may be manufactured and used by or for the Government of the United States of America for governmental purposes without the payment of any royalties thereon or therefor.

The present invention relates to a summation voltmeter and more particularly to a voltmeter which rectifies and smoothes A.C. signals before summation.

Various devices for summing alternating current voltages have been developed in the prior art and generally operate satisfactorily. However, generally the prior art devices sum vectorially the input voltage before rectification. This procedure introduces errors when the input voltages are out of phase with each other due to the vector summation of the out of phase components.

In accordance with the invention a plurality of A.C. signals are each individually filtered to eliminate undesirable frequency components before rectification. The rectified signals are combined in a summation network to form a total composite signal. The composite signal is amplified in a direct current logarithmic amplifier and measured by a direct current voltmeter.

An object of the present invention is to provide a voltmeter which is capable of measuring a plurality of A.C. voltages simultaneously.

Another object of the present invention is to provide an A.C. voltmeter for measuring voltages in a preselected frequency band.

Still another object is to provide an A.C. voltmeter capable of summing A.C. voltages, which may be out of phase, without phase cancellation.

A further object of the invention is to provide an improved variable logarithmic amplifier for use in the voltmeter.

Other objects and many of the attendant advantages of this invention will be readily appreciated as the same becomes better understood by reference to the following detailed description when considered in connection with the accompanying drawings wherein.

Figure 1:
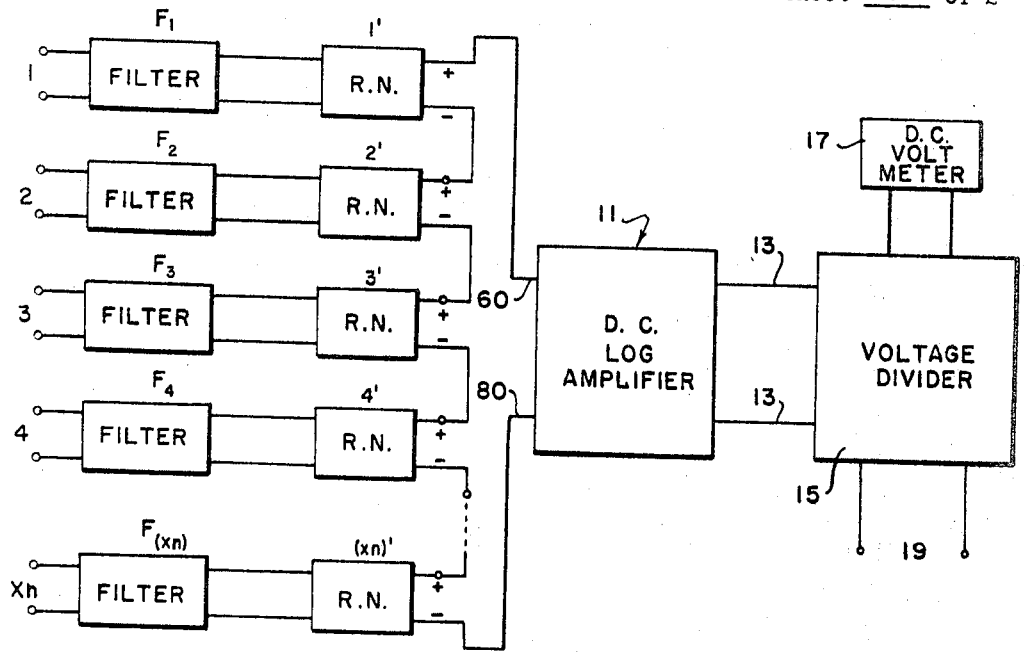
FIG. 1 is a block diagram illustrating the major components of the A.C. voltmeter of the instant invention.

Referring to FIG. 1 a plurality of inputs 1, 2, 3, 4, ... $n$ are provided where ($n$ is any whole integer) which are respectively connected to a plurality of input filters $F_1$, $F_2$, $F_3$, $F_4$, ... $F_n$ for filtering out unwanted frequency components. If, however, there are no superfluous frequency components present the filter $F_1$, $F_2$, $F_3$, $F_4$, ... $F_n$ may be omitted. The outputs of the filters $F_1$, $F_2$, $F_3$, $F_4$, ... $F_n$ are respectively fed to the inputs of a plurality of rectifying networks 1', 2', 3', 4', ... $n'$. The outputs of the rectifying networks 1', 2', 3', 4', ... $n'$ are all connected in series with the input of a variable mu logarithmic amplifier 11 which amplifies the output of all of the rectifying networks. An attenuator 15 is connected by input leads 13 to the output of the variable mu logarithmic amplifier 11. A D.C. voltmeter 17 is connected to the output of the voltage divider 5. The circuit is provided with output terminal 19 for connecting an X–Y recorder.

Figure 2:
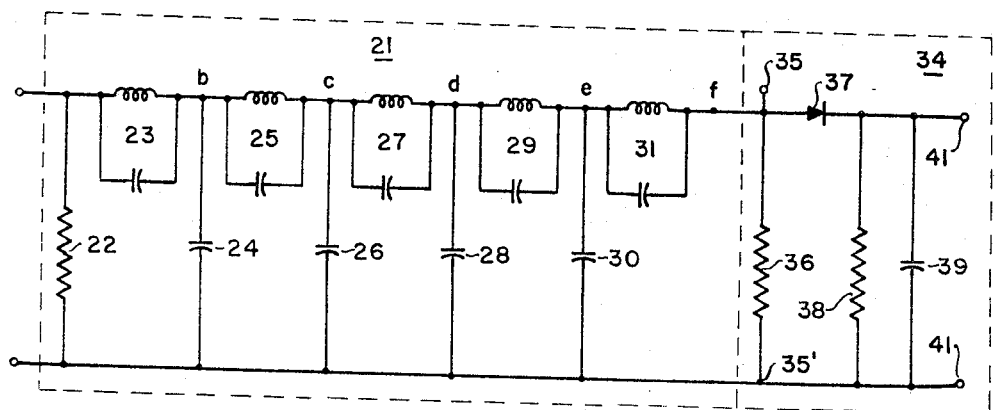
FIG. 2 is a suitable filter and rectifying circuit utilizable in the instant invention.

In order to better understand the operation of the system described in FIG. 1, a description of its components referred to above will be presented at this point, with reference to FIG. 2. A filter 21 is provided for the removal of a R.F. interference signal of 22.3 kc. which was prevalent in the test area. However, the filter can be eliminated if there are no interfering R.F. signals present. In addition, any suitable filter may be substituted for the one illustrated and discussed in the described embodiment. The filter has a resistor 22 connected across the input terminals of the filter. A first tank circuit 23 comprising a parallel connected inductor and capacitor is connected between one of the input terminals of the filter and junction point B. A capacitor 24 connects junction point B with the other input terminal of the filter. A second tank circuit 25, third tank circuit 27, fourth tank circuit 29, and fifth tank circuit 31 each comprising a parallelly connected inductor and capacitor are respectively connected between junction $b$–$c$, $c$–$d$, $d$–$e$ and $e$–$f$. Capacitors 26, 28 and 30, respectively, connect junction points, $c$, $d$ and $e$ to the other input terminal of the filter 21.

In the event that the filter section is not necessary, a pair of input terminals 35, 35' are provided. A rectifying network 34 containing a resistor 36 is connected across input terminals 35, 35'. A rectifying diode 37 has its anode connected to input terminal 35 and its cathode connected to the junction of a parallel connected resistor 38 and a smoothing capacitor 39. The other ends of parallelly connected resistor 38 and smoothing capacitor 39 are connected to input terminal 35'. The output terminals 41 are connected across the smoothing capacitor 39.

Figure 3:
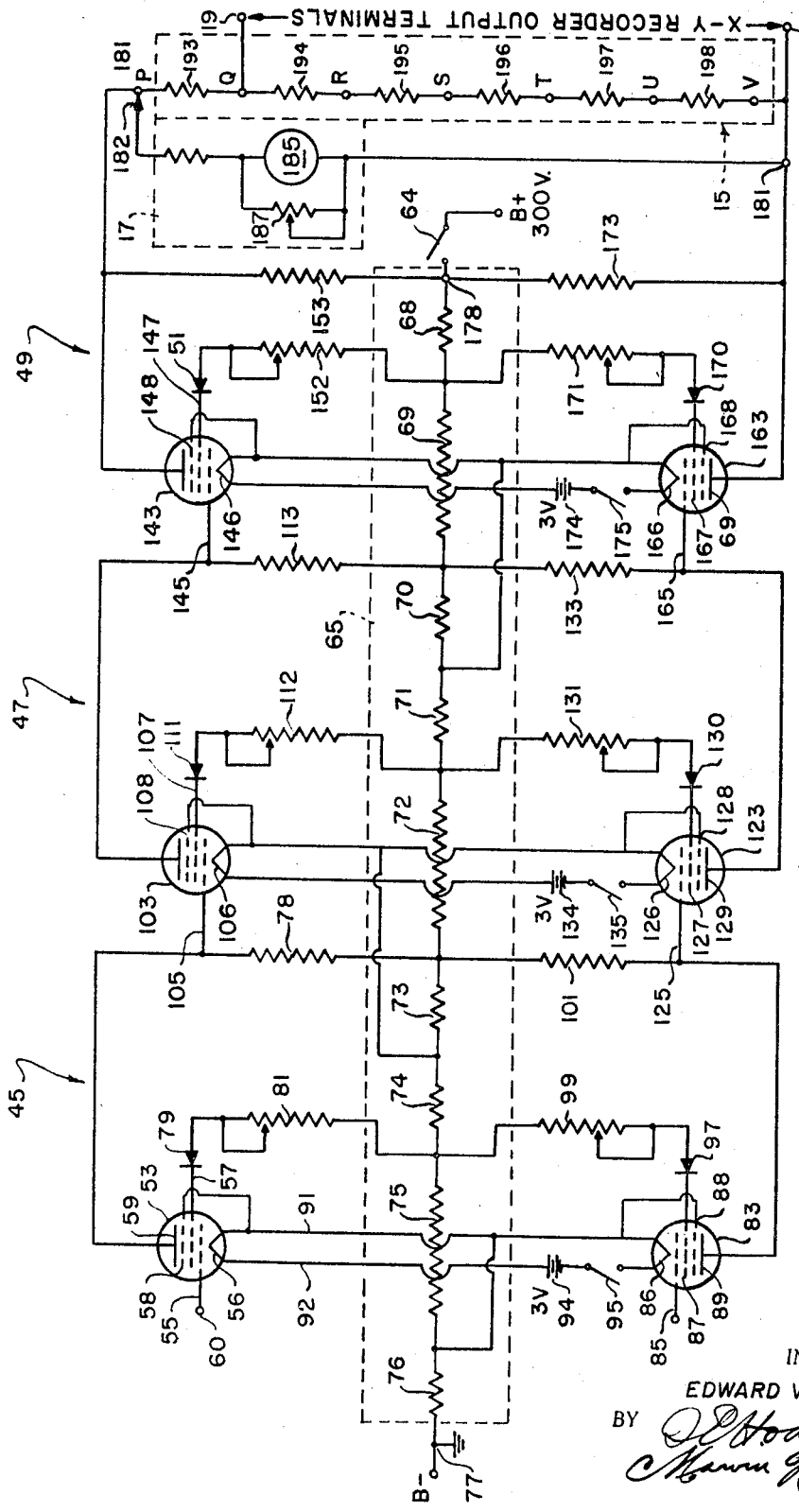
FIG. 3 is a suitable variable mu logarithmic amplifier utilizable in the instant invention.

The variable $m\mu$ logarithmic amplifier illustrated in FIG. 3 has a first amplifier stage 45 which is serially connected with a second amplifier stage 47 and a third amplifier stage 49. The reasons for designating the amplifier stages will become apparent in the description of their operation appearing hereafter. The first stage 45 of the variable $m\mu$ amplifier contains a first pentode 53 having a control grid 55, a cathode 56, a screen grid 57, a suppressor grid 58 and an anode 59. An input terminal 60 is connected to the control grid 55 of pentode 53. A 300 volt source 63 is connected by switch 64 to a potentiometer comprising resistors 68, 69, 70, 71, 72, 73, 74, 75 and 76 connected in series. The other end of the potentiometer 65 and the negative terminal of the 300 volt source are connected to ground.

The anode 59 of pentode 53 is connected through resistor 78 to the junction of resistors 72 and 73. The suppressor grid 58 is connected to the cathode 56. The screen grid 57 is connected to the cathode of diode 79. The anode of diode 79 is connected through potentiometer 81 to the junction point of resistors 74 and 75. A second pentode 83 has a control grid 85, screen grid 87, suppressor grid 88 and an anode 89. An input terminal 80 is connected to the control grid 85 of pentode 83. One end of cathode 56 of pentode 53 is connected through lead 91 to one end of cathode 86 of pentode 83 forming one leg of series circuit. Lead 91 is connected to the junction point of resistors 75 and 76. A second lead 92 completes the series circuit by connecting the other end of cathode 56 to one end of three volt battery 94. The other end of battery 94 is connected through a switch 95 to the other end of cathode 86. The screen grid 87 of pentode 83 is connected to the cathode of diode 97, and the anode of diode 97 is connected through a potentiometer 99 to the junction of resistors 74 and 75. The anode 89 of pentode 83 is connected by resistor 101 to the junction of resistors 72 and 73.

The second amplifier stage 47 contains a pentode 103 having a control grid 105, cathode 106, screen grid 107, a suppressor grid 108 and an anode 109. The screen grid is connected to the cathode of diode 111. The anode of diode 111 is connected through a potentiometer 112 to the junction point of resistors 71 and 72. The control grid 105 of pentode 103 is connected to the anode 59 of pentode 53. The suppressor grid 108 is connected to the cathode 106. The anode 109 of pentode 103 is connected through resistor 113 to the junction point of resistors 69 and 70.

The control grid 125 of pentode 123 is connected to the anode 89 of tube 83. The cathode 126 of pentode 123 is connected to the suppressor grid 128. The screen grid 127 is connected to the cathode of diode 130 and the anode of diode 130 is connected through potentiometer 131 to the junction point of resistors 71 and 72. The anode 129 of tube 123 is connected through resistor 133 to the junction point of resistors 69 and 70. One end of the cathode 126 of pentode 123 is connected to one end of cathode 106 of pentode 103. The other end of cathode 106 is connected to the negative terminal of a 3 volt battery 134. The positive terminal of battery 134 is connected switch 135 to the other end of cathode 126 of pentode 123.

The third amplifier stage 49 contains a pentode 143 having its control grid 145 connected to the anode 109 of pentode 103. The cathode 146 is connected to the suppression grid 148. The screen grid 147 is connected to the cathode of diode 151. The anode of diode 151 is connected through a potentiometer 152 to the junction point of resistors 68 and 69. The anode 149 is connected through resistor 153 to junction point 178. The control grid 165 of pentode 163 is connected to the anode 129 of pentode 123. The cathode 166 of pentode 163 is connected to the suppressor grid 168. The screen grid 167 is connected to the cathode of diode 170. The anode of diode 170 is connected through potentiometer 171 to the junction point of resistor 68 and 69. One end of the cathode 166 of tube 163 is connected to one end of cathode 146 of tube 143. The other end of cathode 146 is connected to the negative terminal of battery 174. The positive terminal of battery 174 is connected through switch 175 to the other end of cathode 166. The anode 169 of pentode 163 is connected through resistor 173 to the junction point 178.

A D.C. voltmeter 17 comprising a variable contact 182 connected in series with a resistor 183 and the parallel connection of a variable resistor 187 and a 100 microampere ammeter movement 185 is connected between terminal 181 and a suitable point along voltage divider 15. Voltage divider 15 contains resistors 193, 194, 195, 196, 197 and 198 connected in series with output connection at junction points P, Q, R, S, T and U. It is understood to those skilled in the art that the voltmeter 17 or the X-Y recorder can be connected to any pair of junction points.

The value of circuit components in an embodiment of the circuit which has been built will be listed at this point in order to clarify the operational characteristics. Resistor 22, 16.5K ohms. Tanks 23 and 31 contain a 576 picofarad capacitor in parallel with an 88 millihenry inductance. Tanks 25 and 29 contain a 288 picofarad capacitor in parallel with a 176 millihenry inductance. Tank 27 contains a 1080 picofarad capacitor in parallel with a 294 millihenry inductance. Capacitors 24 and 30 are 658 picofarads. Capacitors 26 and 28 are 859 picofarads. All inductors in the constructed embodiment are preferably of a Q or quality of at least 35. All capacitors in the constructed embodiment are preferable held to a tolerance of + or 3%. All resistors in the constructed embodiment are preferably held to a tolerance of plus or minus 1%, resistors 36 and 38 are 33.2K ohms. Capacitor 39 is 0.1 microfarad. All the vacuum tubes in the constructed embodiment are preferably 1T4 sharp cut off pentodes having transductance readings of plus or minus 2% with the control grid voltages held constant at 50 volts and the screen grids held constant at 65 volts.

All diodes in the constructed embodiment are 1N626 preferably having forward voltage characteristics curves matched on all points to plus or minus 3% deviation from a means value.

| | Ohms |
|---|---|
| Resistor 68 | 447 |
| Resistor 69 | 9400 |
| Resistor 70 | 194 |
| Resistor 71 | 285 |
| Resistor 72 | 9400 |
| Resistor 73 | 194 |
| Resistor 74 | 285 |
| Resistor 75 | 9400 |
| Resistor 76 | 194 |
| Resistor 78 | 3000 |
| Resistor 81 | 150 |
| Resistor 99 | 150 |
| Resistor 101 | 3000 |
| Resistor 112 | 150 |
| Resistor 113 | 3000 |
| Resistor 131 | 150 |
| Resistor 133 | 3000 |
| Resistor 152 | 150 |
| Resistor 153 | 3000 |
| Resistor 171 | 150 |
| Resistor 173 | 3000 |
| Resistor 183 | 6200 |
| Resistor 187 | 50 |
| Resistor 193 | 100K |
| Resistor 194 | 100K |
| Resistor 195 | 100K |
| Resistor 196 | 100K |
| Resistor 197 | 100K |
| Resistor 198 | 100K |

The operation of FIG. 1 will be discussed making reference to the embodiment which has been constructed. The input filters $F_1$, $F_2$, $F_3$, $F_4$, through $F_{(n)}$ are designed to eliminate 22.3 kc. R.F. generated by a powerful radio station, which is located in the vicinity. It is understood that the filters may be eliminated in areas where there is no interfering R.F. voltage present. However, the filters may be redesigned to eliminate a different R.F. signal prevalent to a given location. The outputs of filters $F_1$, $F_2$, $F_3$, $F_4$, through $F_{(n)}$ are rectified by rectifying network R.N. 1', 2', 3', 4' and (n)'. Referring specifically to the circuit in FIG. 2, diode 37 conducts on the positive portions of the incoming voltage wave charging smoothing capacitor 39. The smoothing capacitor 39 integrates the input voltage providing a relatively smooth output voltage representative of the input pulses. Resistor 38 gradually discharges capacitor 39 and establishes a direct current path through the series connected rectifying networks. Returning to FIG. 1, the rectifying networks 1', 2', 3', 4', through (n)' have their output terminals interconnected forming a summation network for adding the output voltages of the individual rectifying networks. The summed voltage is applied to terminals 60 and 80 to be amplified by the direct current logarithmic amplifier illustrated in detail in FIG. 3.

The logarithmic amplifier of the constructed embodiment contains stages 45, 47 and 49 operating in identical fashion supplying a logarithmic conversion of approximately 35 db per stage. Specifically, referring to stage 45, the screen grid potential on remote cut off tube 53 is controlled by the forward voltage conducting characteristics of the 1N626 diode. As the pentode becomes more conductive, the screen grid draws more current through diode 79 causing the forward voltage to drop across the diode to decrease, thereby reducing the positive bias potential on the screen grid 57.

Figure 4:
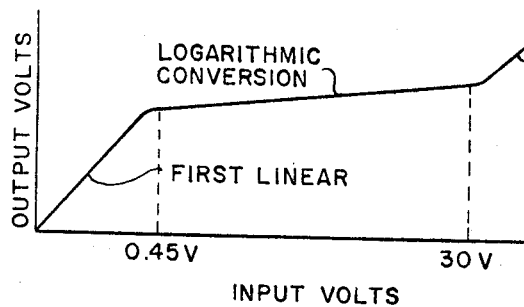
FIG. 4 is a graph of the input voltage versus the output voltage of an amplifier stage illustrated in FIG. 3.

The characteristics of the sharp cut off pentode 53, utilized in the constructed embodiment, causes the screen grid interaction with the diode 79 to take place for a range of input voltages between 0.54 volt and 30 volts placed on the control grid 55. Resistors 81 and 99 are adjusted in order to balance the amplification of tubes 53 and 83. The amplifier stage 45 linearly amplifies the input signal on its control grid from 0.0 volt to 0.54 volt and above 30 volts, as illustrated in FIG. 4. The individual amplifier stages 47 and 49 operate similarly to stage 45.

The following table discloses the class of operation of the individual amplifier stages of the constructed embodiment for given input voltage ranges. However, the values of the circuit parameters can be changed in order to change the operating voltage ranges of the individual amplifier stages.

| Input to first stage (volts) | Stage 45 | Stage 47 | Stage 49 |
| --- | --- | --- | --- |
| 0.54–30.0 | Log conversion | 2nd linear | 2nd linear. |
| 0.009–0.54 | 1st linear | Log conversion | Do. |
| 0.0000162–0.009 | do | 1st linear | Log conversion. |

Returning to FIG. 1, the amplified voltage is fed from the logarithmic amplifier to a voltage divider 15 illustrated in FIG. 3. The output range of the meter is selected by moving wiper 182 to the desired calibrated contact points P, Q, R, S, T or U and reading the current passing through the ammeter unit 185. An X–Y recorder is connected across terminal 19 for obtaining a voltage versus time plot.

What is claimed is:
1. A nonphase-sensitive voltmeter comprising:
a plurality of separate means for respectively rectifying a plurality of alternating voltages having different phase relationships to each other;
each of said rectifying means having a pair of output terminals, all of said output terminals of said rectifying means being connected in a series circuit;
direct current logarithmic amplifier means having a plurality of stages, each of said stages comprising a pair of pentodes, and means connected as an input for said pentodes for causing said pentodes to operate as logarithmic converters for a portion of their operating curve, the first of said amplifier stages having its input connected in series with said series circuit of the outputs of the plurality of rectifying means; and
voltage measuring means connected to the output of the last of said amplifier stages for measuring the sum of the plurality of input voltages.

2. A nonphase-sensitive voltmeter as defined in claim 1 but further characterized by each of said rectifying means comprising a first resistor, a diode having its first terminal connected to one end of said first resistor; a second resistor connected in parallel with a capacitor to form a parallel R.C. circuit, one end of said R.C. circuit being connected to the second terminal of the diode and the other end of said R.C. circuit being connected to the other end of said first resistors.

3. A nonphase-sensitive voltmeter as defined in claim 2 but further characterized by having said pentodes being 1T4 sharp cutoff pentodes and said means for causing said pentodes to operate as logarithmic convertors being 1N626 diodes.

4. A nonphase-sensitive voltmeter as defined in claim 1 but further characterized by having said pentodes being 1T4 sharp cutoff pentodes and said means for causing said pentodes to operate as logarithmic convertors being 1N626 diodes.

5. A direct current logarithmic amplifier comprising: a first and second pentode each having a respective cathode, anode, control grid, screen grid and suppressor grid;
said cathodes being interconnected;
an input source being connected between the control grids of said first and second pentodes;
said cathodes of said first and second pentodes being respectively connected to said suppressor grids;
a source of B plus voltage coupled to the anodes of said first and second pentodes;
a first and second diode having their respective cathodes connected to the screen grids of said first and second pentodes; and
said anodes of said diodes being resistively coupled to said supply of B plus voltage.

6. A direct current logarithmic amplifier comprising:
a first, second, third and fourth 1T4 pentode each respectively having a cathode, an anode, a control grid, a screen grid and a suppression grid;
the anodes of said first and third pentodes being respectively connected to the control grids of said second and fourth pentodes;
a source of ground potential;
a voltage divider containing a plurality of resistors in series with one end connected to ground potential;
a source of B plus voltage connected to the other end of said plurality of resistors;
the cathodes of said first and third pentodes being connected to the junction point of a first and second resistor of said plurality of resistors;
a first 1N626 diode having its cathode connected to the screen grid of the first pentode and its anode connected to the junction point of said second and third resistor of said plurality of resistors;
a second 1N626 diode having its cathode connected to the screen grid of said third pentode and having its anode coupled to the junction point of said second and third resistors of said plurality of resistors;
said anodes of said first and third pentodes being respectively resistively connected to the junction point of a fourth and fifth resistor of said plurality of resistors;
said cathodes of said second and fourth pentodes being connected to the junction point of said third and fourth resistors of said plurality of resistors;
a third 1N626 diode having its cathode connected to the screen grid of said second pentode and its anode resistively connected to the junction of the fifth and sixth resistors of said plurality of resistors;
a fourth 1N626 diode having its cathode connected to the screen grid of said fourth pentode and its anode resistively connected to the junction of the fifth and sixth resistors of said plurality of resistors; and
said anodes of said second and fourth pentodes being respectively resistively connected to the source of B plus voltage.

References Cited

UNITED STATES PATENTS

| 2,521,522 | 9/1950 | Keitley | 324—119 X |
| 2,575,073 | 11/1951 | Selz | 324—132 X |
| 2,763,837 | 9/1956 | Follingstad | 324—132 |
| 2,980,867 | 4/1961 | Nelson | 328—145 X |
| 2,244,369 | 6/1941 | Martin | 324—119 X |
| 2,903,524 | 9/1959 | Howell | 328—145 X |

FOREIGN PATENTS

| 860,681 | 2/1961 | Great Britain. |
| 879,138 | 2/1943 | France. |

RUDOLPH V. ROLINEC, *Primary Examiner.*

A. E. SMITH, *Assistant Examiner.*

U.S. Cl. X.R.

324—132; 328—145; 330—110